United States Patent
Kato et al.

(10) Patent No.: US 10,078,238 B2
(45) Date of Patent: Sep. 18, 2018

(54) DISPLAY DEVICE

(71) Applicant: Japan Display Inc., Minato-ku (JP)

(72) Inventors: Katsuhiro Kato, Tokyo (JP); Toru Yagasaki, Tokyo (JP); Haruki Yamada, Tokyo (JP)

(73) Assignee: Japan Display Inc., Minato-ku (JP)

( * ) Notice: Subject to any disclaimer, the term of this patent is extended or adjusted under 35 U.S.C. 154(b) by 82 days.

(21) Appl. No.: 15/240,559

(22) Filed: Aug. 18, 2016

(65) Prior Publication Data
US 2017/0075161 A1    Mar. 16, 2017

(30) Foreign Application Priority Data

Sep. 11, 2015 (JP) ................................ 2015-179822

(51) Int. Cl.
*G02F 1/13* (2006.01)
*G02F 1/1333* (2006.01)
*G02F 1/1335* (2006.01)

(52) U.S. Cl.
CPC .. *G02F 1/133308* (2013.01); *G02F 1/133512* (2013.01); *G02F 2001/133331* (2013.01); *G02F 2202/023* (2013.01); *G02F 2202/28* (2013.01)

(58) Field of Classification Search
CPC ........... G02F 1/133512; G02F 1/13439; G02F 1/133308
See application file for complete search history.

(56) References Cited

U.S. PATENT DOCUMENTS

| | | | |
|---|---|---|---|
| 6,407,783 B1* | 6/2002 | Ohgawara | G02F 1/133512 349/110 |
| 2003/0147115 A1* | 8/2003 | Takizawa | G02F 1/133512 359/263 |
| 2009/0122242 A1* | 5/2009 | Nakamura | G02F 1/133512 349/110 |
| 2009/0186552 A1* | 7/2009 | Shinya | G02F 1/133502 445/58 |
| 2010/0003425 A1* | 1/2010 | Kamata | G02F 1/133308 428/1.5 |
| 2011/0134378 A1* | 6/2011 | Tsuboi | G02F 1/133512 349/110 |
| 2011/0291095 A1* | 12/2011 | Park | G02F 1/133512 257/59 |
| 2012/0314144 A1* | 12/2012 | Sugita | H04N 13/0404 349/15 |
| 2013/0002974 A1* | 1/2013 | Minato | G02B 5/201 349/43 |
| 2013/0038811 A1* | 2/2013 | Sugita | G02B 27/22 349/61 |

(Continued)

FOREIGN PATENT DOCUMENTS

JP    2014-122947    7/2014

*Primary Examiner* — Thomas A Hollweg
*Assistant Examiner* — Mary A El Shammaa
(74) *Attorney, Agent, or Firm* — Oblon, McClelland, Maier & Neustadt, L.L.P.

(57) ABSTRACT

According to one embodiment, there is provided a display device including a display module and a cover member, bonded together by a photosensitive resin layer. A portion of the photosensitive resin layer that is located behind a light-shielding portion (in other words, located in a shaded portion) with respect to the light for curing the photosensitive resin is cured.

14 Claims, 10 Drawing Sheets

(56) References Cited

U.S. PATENT DOCUMENTS

| | | | |
|---|---|---|---|
| 2013/0100375 A1* | 4/2013 | Inoue | G02B 27/26 349/61 |
| 2013/0321911 A1* | 12/2013 | Yamayoshi | G02B 27/2214 359/462 |
| 2014/0063719 A1* | 3/2014 | Yamazaki | G06F 1/1601 361/679.21 |
| 2014/0178618 A1 | 6/2014 | Tanabe et al. | |

* cited by examiner

DISPLAY DEVICE

CROSS-REFERENCE TO RELATED APPLICATIONS

This application is based upon and claims the benefit of priority from Japanese Patent Application No. 2015-179822, filed Sep. 11, 2015, the entire contents of which are incorporated herein by reference.

FIELD

Embodiments described herein relate generally to a display device.

BACKGROUND

Recently, in terms of environmental friendliness such as space saving or energy saving types of electronic products have been increasing, which utilise liquid crystal panels or organic electroluminescent (EL) panels as display devices, representatively including liquid crystal monitors, liquid crystal televisions, feature phones, smartphones, tablet computers, electronic book readers and notebook computers. In particular, in electronic devices such as smartphones, tablet computers, electronic book readers and feature phones, the display panel, for example, a liquid crystal panel or organic electroluminescent panel, is covered by a phototransmissive cover member such as a touchpanel which allows the user to input data by touching the screen with fingers, etc., or a cover glass which covers the outer circumferential portion of the screen other than the display portion.

To bond the display panel with the cover member, an ultraviolet curable resin is applied to one of them. This one is overlapped with the other one. After the resin expands to the necessary filling area, the resin is irradiated with ultraviolet light perpendicularly to the flat surface of the cover member of the display device, thus curing the resin.

In consideration of variation in the amount of resin applied, or prevention of bubbles, it is difficult to restrict the area to be filled with the resin to only the display area (active area) which displays an image. Thus, the filling area of the resin may be expanded to the outside of the active area and range to the circumferential portion of the cover glass covered by a light-shielding layer, etc., which is hard to transmit light. In this case, the resin may not be cured or may be insufficiently cured in the portion within the filling area of the resin, that is located under the light-shielding layer which the ultraviolet light radiated perpendicularly to the flat surface of the cover member is hard to reach.

DETAILED DESCRIPTION

In general, according to one embodiment, there is a provided a display device comprising: a display module comprising a display area which displays an image, and a peripheral area located outside the display area; a cover member comprising a phototransmissive portion facing the display area, and a light-shielding area facing the peripheral area; and a photosensitive resin layer which is provided between the display module and the cover member, and bonds the display module with the cover member. The photosensitive resin layer comprises a first portion and a second portion. The first portion is provided over an entire part between the display area and the phototransmissive portion. The second portion extends from the first portion to a portion located under the light-shielding area. A lightguide member is provided under the light-shielding area so as to face the second portion of the photosensitive resin layer, and transmits light having a wavelength for curing the photosensitive resin layer therethrough to make the light incident upon the photosensitive resin layer.

Embodiments will be described hereinafter with reference to the accompanying drawings. Elements common in the embodiments are denoted by the same reference numbers or symbols, duplicate explanations are omitted. The drawings are exemplary diagrams to aid understanding of the embodiments. The shapes, dimensions or ratios in the drawings may differ from what is implemented.

Figure 1:
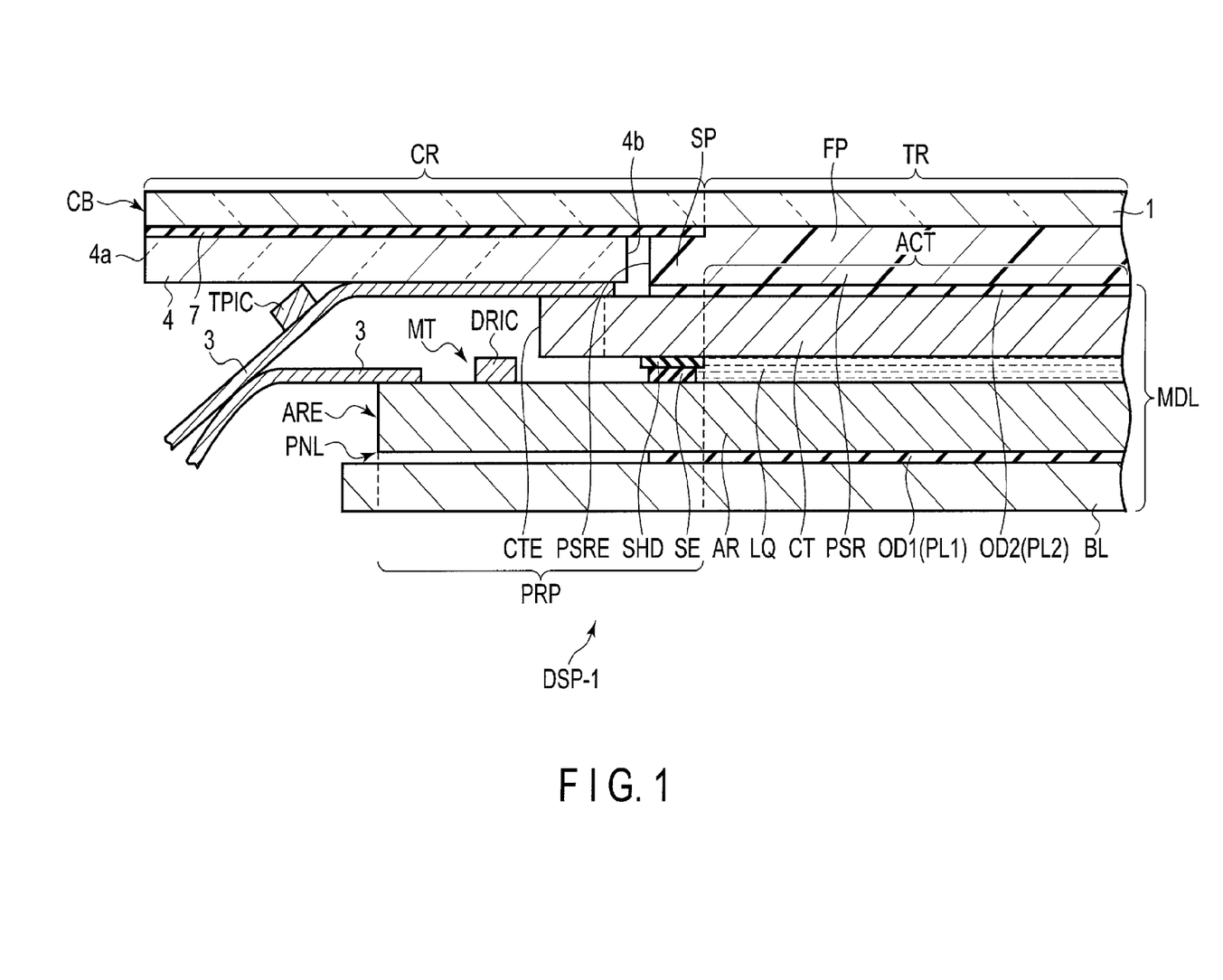
FIG. 1 is an enlarged cross-sectional view schematically illustrating a display device according to a first embodiment.

FIG. 1 is an enlarged cross-sectional view schematically illustrating a display device DSP-1 according to a first embodiment. The display device DSP-1 comprises a display module MDL which displays an image in a display area ACT, a cover member CB which faces the display module MDL, a layer PSR of a cured photosensitive resin which bonds the display module MDL with the cover member CB, and a lightguide member 4 provided under the cover member.

In the example illustrated in the figure, the display module MDL comprises a display panel PNL and a backlight BL. The display panel PNL and the backlight BL may be integrated by, for example, a double-sided tape.

The backlight BL is provided on the rear side of the display panel PNL. Various forms can be applied to the backlight BL. Either a light-emitting diode (LED) or a cold-cathode fluorescent lamp (CCFL) can employed as the light source of the backlight BL. The explanation of the detailed structure is omitted.

In the present embodiment, the display panel PNL is a liquid crystal panel. However, the display panel PNL may be a different display panel such as an organic electroluminescent panel.

The display panel (liquid crystal panel) PNL is, for example, an active-matrix liquid crystal panel, and comprises an array substrate AR and a counter-substrate CT. The array substrate AR is bonded with the counter-substrate CT by a sealing material SE such that a predetermined cell gap is formed between the substrates. The cell gap is formed by a plurality of columnar spacers (not illustrated) provided between the array substrate AR and the counter-substrate CT. A liquid crystal LQ is held in the area surrounded by the sealing material SE in the cell gap.

Regarding the array substrate AR, the detailed explanation of the structure of the inner surface facing the counter-substrate CT is omitted. A first optical element OD1 comprising a first polarizer PL1 is bonded to the external surface of the array substrate AR facing the backlight BL. The first optical element OD1 is provided over at least the entire active area ACT. In the example illustrated in the figure, the first optical element OD1 further extends to a peripheral area PRP.

Regarding the counter-substrate CT, the detailed explanation of the structure of the inner surface facing the array substrate AR is omitted. However, it should be noted that a peripheral light-shielding layer SHD is provided on the inner surface of the counter-substrate CT. The peripheral light-shielding layer SHD is provided around the active area ACT and has the shape of a rectangular frame surrounding the active area ACT although the detailed explanation is omitted here. Thus, the peripheral light-shielding layer SHD is provided in the peripheral area PRP of the display panel PNL. A second optical element OD2 including a second polarizer PL2 is bonded to the external surface of the counter-substrate CT facing the cover member CB. The second optical element OD2 is provided over the entire active area ACT. The second optical element OD2 further extends to the peripheral area PRP. The extended end portion of the second optical element OD2 is located at a position overlapping the peripheral light-shielding layer SHD.

In the display panel PNL having the above structure, the peripheral area PRP includes the area in which the peripheral light-shielding layer SHD is provided. The peripheral area PRP further includes an area outside the peripheral light-shielding layer SHD. The peripheral area PRP includes a mounting portion MT provided on the external side beyond a substrate end portion CTE of the counter-substrate CT. A liquid-crystal-panel driving IC chip DRIC and an FPC substrate 3 as signal supply sources are mounted in the mounting portion MT of the array substrate AR. The liquid-crystal-panel driving IC chip DRIC is mounted in the mounting portion MT so as to be located on a side close to the active area ACT, in other words, so as to be located at a position close to the substrate end portion CTE. The FPC substrate 3 is mounted in the mounting portion MT so as to be located on the external side in comparison with the liquid-crystal-panel driving IC chip DRIC, in other words, so as to be located at a position close to an array substrate end portion ARE of the array substrate AR. A touchpanel driving IC chip TPIC capable of driving a touchpanel is mounted in a part of the FPC substrate 3.

Figure 2:
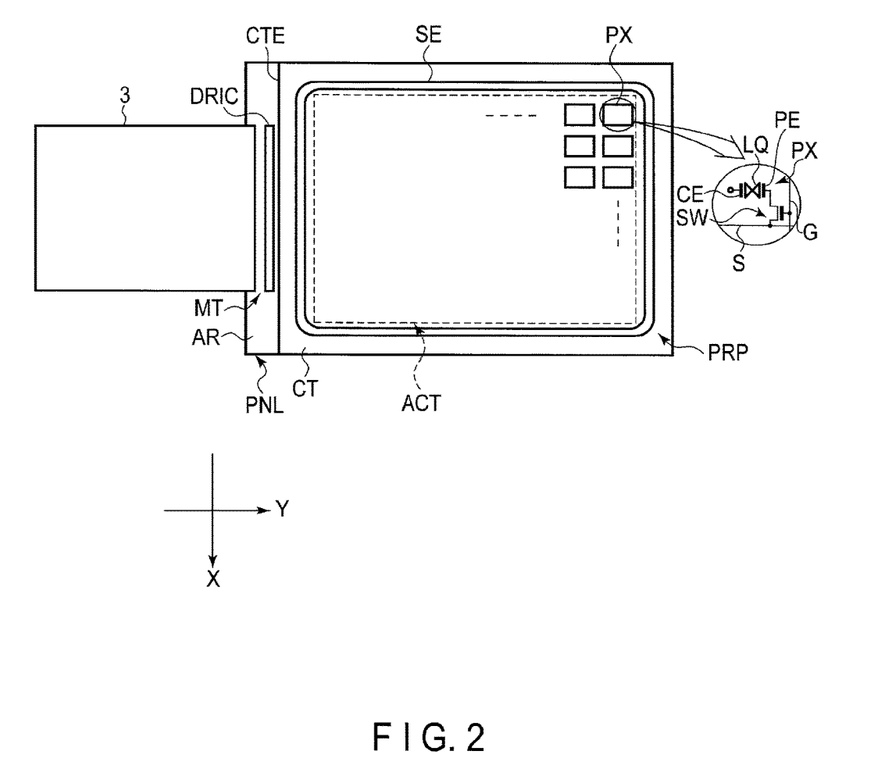
FIG. 2 is a plan view schematically illustrating a display panel provided in the display device according to the first embodiment.

FIG. 2 is a top view of the display panel PNL illustrated in FIG. 1. As clearly illustrated in FIG. 2, the display area ACT corresponds to the area surrounded by the sealing material SE. The display area ACT is, for example, substantially rectangular, and comprises m×n pixels PX arrayed in a matrix, where m and n are positive integers. The array substrate AR comprises a gate line G extending in a first direction X, a source line S extending in a second direction Y perpendicular to the first direction X, a switching element SW connected to the gate line G and the source line S, a pixel electrode PE connected to the switching element SW, etc. A counter-electrode CE facing the pixel electrode PE of each pixel via the liquid crystal layer LQ is provided on, for example, the counter-substrate CT.

Although the explanation of the detailed structure of the liquid crystal panel is omitted, the liquid crystal panel is structured such that a mode mainly using a vertical electric field, such as a twisted nematic (TN) mode, an optically compensated bend (OCB) mode or a vertical alignment (VA) mode, or a mode mainly using a lateral electric field, such as an in-plane switching (IPS) mode or a fringe field switching (FFS) mode, may be applied. When a mode using a lateral electric field is applied, both the pixel electrode PE and the counter-electrode CE are provided on the array substrate AR.

The signal supply sources which supply signals necessary to drive the display panel PNL, such as the liquid-crystal-panel driving IC chip DRIC and the FPC substrate 3, are located in the peripheral area PRP provided outside the active area ACT as described above. The liquid-crystal-panel driving IC chip DRIC and the FPC substrate 3 are mounted on the mounting portion MT of the array substrate AR extending to the external side in comparison with the substrate end portion CTE of the counter-substrate CT. The peripheral area PRP is the area surrounding the active area ACT and includes the area in which the sealing material SE is provided. The peripheral area PRP has the shape of a rectangular frame.

In addition to the function for displaying an image in the active area ACT, the display panel PNL may comprise, for example, a built-in touchsensor which detects a contact of an object on the surface of the cover member CB as described later. The touchsensor may be provided on the detection surface of the counter-substrate CT of the display panel PNL. Although the detailed explanation of the touchsensor is omitted here, for example, a capacitive type for detecting the change in electrostatic capacitance of sensing lines can be applied. As illustrated in FIG. 1, the FPC substrate 3 and the touchpanel driving IC chip TPIC connected to the touchsensor are also mounted.

Returning to FIG. 1, the cover member CB comprises a transparent substrate 1. The cover member CB comprises a phototransmissive portion TR and a light-shielding portion CR. The transparent substrate 1 is, for example, a transparent glass plate or plastic plate. The thickness of the transparent substrate 1 is not particularly limited. The transparent substrate 1 may be a film which is comparatively thin, or may be a flat plate which is comparatively thick.

The phototransmissive portion TR is a portion of the transparent substrate 1 itself, and faces the display area ACT of the display panel PNL.

The light-shielding portion CR is located in the peripheral portion of the phototransmissive portion TR. The light-shielding region CR faces the peripheral area PRP of the display module MDL. As a matter of course, the light-shielding portion CR also faces the signal supply sources (the liquid-crystal-panel driving IC chip DRIC and the FPC substrate 3). The light-shielding portion CR is adjacent to the phototransmissive portion TR, and also faces the end portion of the second optical element OD2 located in the peripheral area PRP of the display panel PNL, the substrate end portion CTE of the counter-substrate CT, and the array substrate end portion ARE of the array substrate AR. The light-shielding portion CR is also located above the peripheral light-shielding layer SHD. The light-shielding portion CR is formed by providing a colored layer 7 on the rear surface of the transparent substrate 1. The colored layer 7 is provided over the entire light-shielding portion CR on the rear surface of the substrate 1. The colored layer 7 is not provided in the phototransmissive portion TR.

The color of the colored layer 7 may be black, or may be selected from various other colors. The light-shielding portion CR is shaded from light by the colored layer 7 so as to prevent visual confirmation of the peripheral area PRP of the display module MDL when observed from the front side of the cover member CB (or so as to prevent light from going into the peripheral area PRP of the display module MDL from the front side of the cover member CB). The light perpendicularly emitted from the above to the flat surface of the cover member CB is blocked by the light-shielding portion CR.

Figure 3:
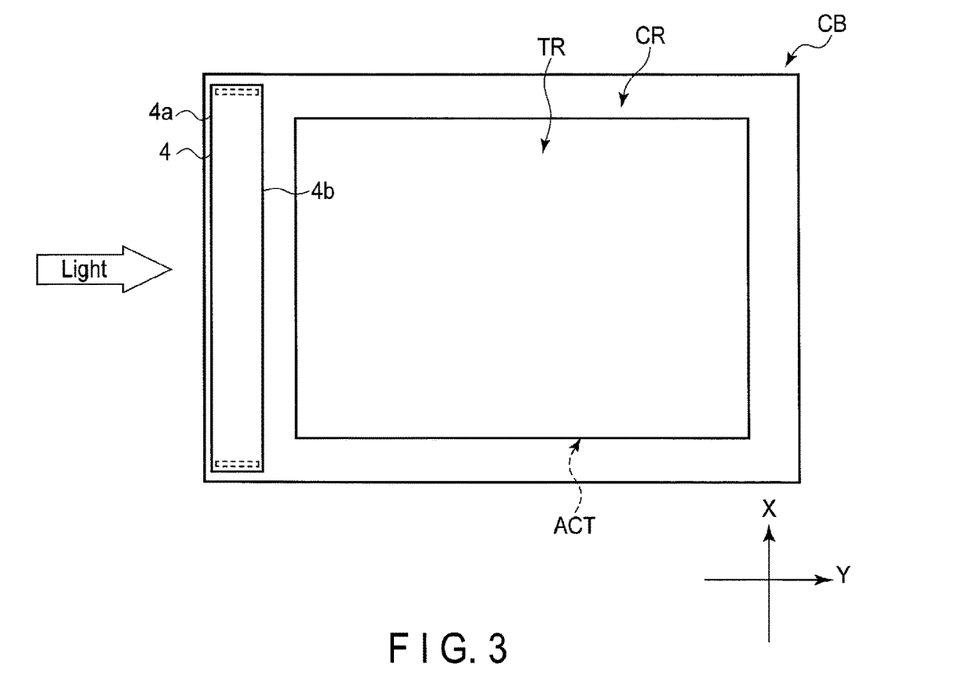
FIG. 3 is a plan view illustrating a cover member and a lightguide member provided in the display device according to the first embodiment.

FIG. 3 is a bottom view of the cover member CB incorporated into the display device DSP-1 illustrated in FIG. 1. As illustrated in FIG. 3, the cover member CB is, for example, substantially rectangular, having short sides in the first direction X and long sides in the second direction Y. The phototransmissive portion TR is located substantially in the central portion of the cover member CB and has a shape corresponding to that of the display area ACT. In the example illustrated in the figure, the phototransmissive portion TR is rectangular. As described above, the light-shielding portion CR is located in the outer circumferential portion of the cover member CB and has a frame shape surrounding the phototransmissive portion TR. In the example illustrated in the figure, the light-shielding portion CR has a frame shape continuously formed around the phototransmissive portion TR, and extends to each side of the cover member CB.

As illustrated in FIG. 1, the cured layer PSR of the photosensitive resin is interposed between the top surface of the display module MDL and the rear surface of the cover member CB. At least a part of the cured layer PSR extends to the portion located under the colored layer 7. In the example illustrated in the figure, the cured photosensitive resin layer PSR is in contact with the surface of the second optical element OD2 on the display module MDL side. The cured photosensitive resin cured layer PSR is in contact with the phototransmissive portion TR and the light-shielding portion CR on the cover member CB side. The cured photosensitive resin cured layer PSR comprises an edge PSRE. The edge PSRE is located under the light-shielding portion CR of the cover member CB outside the active area ACT of the display module MDL. Specifically, the cured photosensitive resin layer PSR comprises a first portion FP and a second portion SP. The first portion FP is provided in the entire part between the phototransmissive portion TR of the cover member CB and the display area ACT of the display module MDL. The second portion SP extends from the first portion to the portion located under the light-shielding portion CR of the cover member CB. The light for curing the resin which is perpendicularly emitted from the above to the flat surface of the cover member cannot reach the second portion SP because of the presence of the light-shielding portion CR.

The photosensitive resin which is cured to form the cured layer PSR is a transparent material which is cured by irradiation with light having a specific wavelength. As the photosensitive resin, for example, UV-curable resin which is cured by irradiation with ultraviolet light having a wavelength in a range (for example, 200 to 450 nm) commonly used to cure a photosensitive resin to bond a cover member to a display panel is preferably used. The above wavelength range does not indicate the energy absorption band of UV-curable resin. Instead, UV-curable resin is cured by using, for example, a cold-cathode lamp or metal halide lamp which has an emission spectrum in the above wavelength range. Curing is performed by using a wavelength which is balanced between the energy amount and the absorptive power, such as 253, 365 or 405 nm, in accordance with the characteristics of UV-curable resin.

With reference to FIG. 1 and FIG. 3, the lightguide member 4 is provided away from the cured photosensitive resin layer PSR under the light-shielding portion CR of the cover member CB. As clearly illustrated in FIG. 3, the lightguide member 4 has the shape of a band extending parallel to the short sides of the flat surface of the cover member CB (in other words, parallel to the first direction X). The cross-sectional surface perpendicular to the longitudinal direction of the lightguide member 4 is rectangular. The lightguide plate 4 has, for example, a length of 50 to 170 mm, and a width of 3 to 10 mm (the width is equivalent to the length in the second direction Y). More strictly, the thickness of the lightguide member 4 is set by the following equation (1):

$$\text{(thickness of polarizer PL2+thickness of photosensitive resin cured layer PSR)} - \text{(thickness of FPC substrate 3+thickness of colored layer 7)} \quad (1)$$

Two edge faces 4a and 4b facing each other in a direction (second direction Y=width direction) perpendicular to the longitudinal direction of the lightguide member 4 structure a light entrance face and a light exit face, respectively. Light emitted from a light source in the direction (second direction Y) illustrated by the arrow in FIG. 3 enters the light entrance face. The light which entered the light entrance face and was guided in the lightguide member 4 exits through the light exit face to the photosensitive resin layer corresponding to the cured layer PSR. Thus, the lightguide member 4 has the shape of a band comprising the light entrance face and the light exit face. The lightguide member 4 having the shape of a band may be formed by a resin film, sheet, plate, etc.

As described above, the lightguide member 4 has the shape of a band. Thus, the light which can enter the photosensitive resin layer after passing through the lightguide member 4 is assumed to be substantially parallel to the flat surface of the cover member CB. When the refractive index of air is $n_a$, and the refractive index of the lightguide member 4 is $n_l$, light has a reflectance of $R=(n_a-n_l)^2/(n_a+n_l)^2$ at the interface between air and the lightguide member 4. To reduce the reflectance as much as possible, the refractive index $n_l$ of the lightguide member 4 is preferably as close to 1 as possible. When the light exit face 4b is in contact with the photosensitive resin layer, the total reflectance can be decreased. For example, when the refractive index of the photosensitive resin layer is 1.52, and the refractive index of the lightguide member 4 is 1.6, and light is emitted to the photosensitive resin layer after passing through air, the lightguide member 4 and air in order, the reflectance can be reduced by approximately 64% in total.

In FIG. 1 and FIG. 3, the lightguide member 4 is provided at a position facing the area in which the FPC substrate 3, the liquid-crystal-panel driving IC chip DRIC, the touchpanel driving IC chip TRIC, etc., are provided, on the rear surface of the cover member CB. However, the shape or position of the lightguide member 4 is not limited to this example. For example, the lightguide member 4 may be provided in the peripheral area of the display device DSP-1 and have the shape of a frame surrounding the cured photosensitive resin layer PSR. The lightguide member 4 may be bonded to the cover member CB or the FPC substrate 3 with an adhesive. In this case, since the refractive index of the lightguide member 4 is close to that of the adhesive, light will probably leak from the adhesion interface between the lightguide member 4 and the adhesive. Thus, the lightguide member 4 is preferably bonded to the cover member CB, the FPC substrate 3, etc., with an adhesive in an area in which the cured photosensitive resin layer PSR is not present in the posterior part of the travelling direction of light. For example, the lightguide member 4 may be bonded to the cover member CB or the FPC substrate 3 near the end portions of the lightguide plate 4 in the longitudinal direction (in other words, in the areas surrounded by the dotted lines in the figure.)

Figure 4:
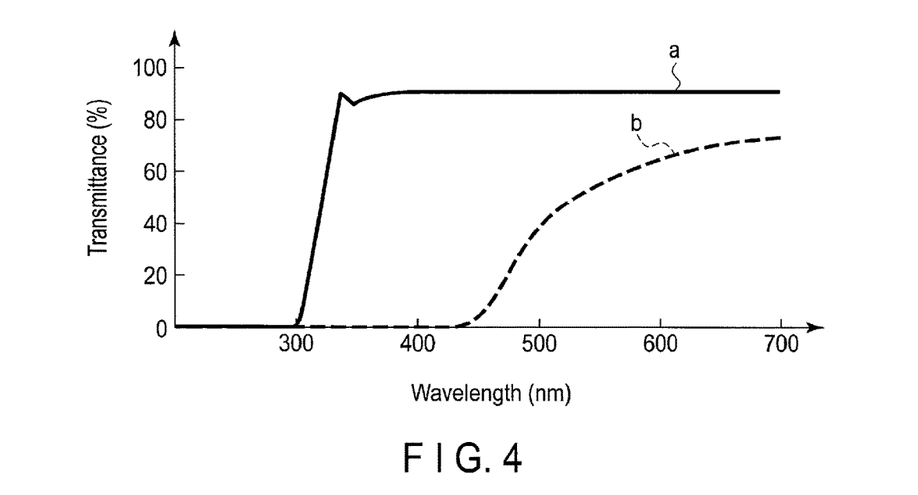
FIG. 4 is a graph showing the ultraviolet transmittance of PET having high transmittance in the ultraviolet region and polyimide resin.

The transmittance of the lightguide member 4 is preferably high for light having a wavelength for which photosensitive resin shows photosensitivity. For example, a material having a transmittance of 80% or greater for ultraviolet light having a wavelength in a range (for example, 200 to 450 nm) commonly used to cure photosensitive resin is preferably used for the lightguide member 4. As such a lightguide member, polyethylene terephthalate resin having high transmittance for ultraviolet light (hereinafter, referred to as PET having high transmittance in the ultraviolet region) is preferably used. In FIG. 4, line segment a indicates the relationship between the wavelength of light and the transmittance of light regarding PET having high transmittance in the ultraviolet region. For comparison, in FIG. 4, line segment b indicates the relationship between the wavelength of light and the transmittance of light regarding polyimide resin, which is commonly used as the material of the reinforcing tape of a cover member or an FPC substrate. PET having high transmittance in the ultraviolet region has a transmittance of 80% or greater for light having a wavelength of approximately 340 nm or greater, and has a transmittance of approximately 90% for ultraviolet light having a wavelength in the range of 365 to 450 nm. Thus, PET having high transmittance in the ultraviolet region can be suitably employed for the lightguide member 4. The polyimide resin shows a transmittance for light having a wavelength of approximately 440 nm or greater. The longer the wavelength is, the greater the transmittance is. However, the transmittance is less for light having a wavelength in the ultraviolet region. Thus, the polyimide resin does not have transmittance, or has an excessively less transmittance, for ultraviolet light having a wavelength in the range of 200 to 450 nm. Thus, if an FPC substrate 3 or reinforcing tape using polyimide as the material is present in the light path from the light source to the photosensitive resin, ultraviolet light is hard to reach the photosensitive resin.

To manufacture the display device DSP-1 of the first embodiment illustrated in FIG. 1 to FIG. 3, the cover member comprising the lightguide member 4 is bonded to the display module comprising the FPC substrate 3, etc., with photosensitive resin such that the photosensitive resin is provided in an area equivalent to the cured layer PSR illustrated in FIG. 1. Subsequently, the photosensitive resin layer is irradiated with light (for example, ultraviolet light) perpendicularly from the above to the surface of the cover member CB (hereinafter, referred to as perpendicular downward irradiation). At the same time, the lightguide member is irradiated with light in a direction perpendicular to the surface of the cover member CB (in other words, in a direction perpendicular to the light entrance face of the lightguide member 4) (hereinafter, referred to as lateral irradiation). In the perpendicular downward irradiation, the photosensitive resin located under the phototransmissive portion TR of the cover member CB (equivalent to the first portion of the cured layer PSR) is cured with light. By contrast, it is difficult to cure the portion located under the light-shielding portion CR of the cover member CB. However, in the lateral irradiation, light passes through the lightguide member 4, and exits from the light exit face 4b to the photosensitive resin located under the light-shielding portion CR of the cover member CB. In this manner, the photosensitive resin in this portion is cured with the light. By the above method, the display device DSP-1 illustrated in FIG. 1 to FIG. 3 can be manufactured. At this time, as illustrated in FIG. 1, the lightguide member 4 also functions to push down structures which are provided in the peripheral area PRP and block light, such as the FPC substrate 3 and the touchpanel driving IC chip TPIC. By pushing down the shield structures, the path of light for curing is expanded. The amount of light entering the lightguide member 4 is increased. If the lightguide member 4 is not provided, the FPC substrate 3 rolls back, and thus, the FPC substrate 3 and the touchpanel-driving IC chip TPIC block the light emitted from the lateral side. In this way, light is hard to reach the photosensitive resin layer corresponding to the cured photosensitive resin layer PSR.

Figure 5:
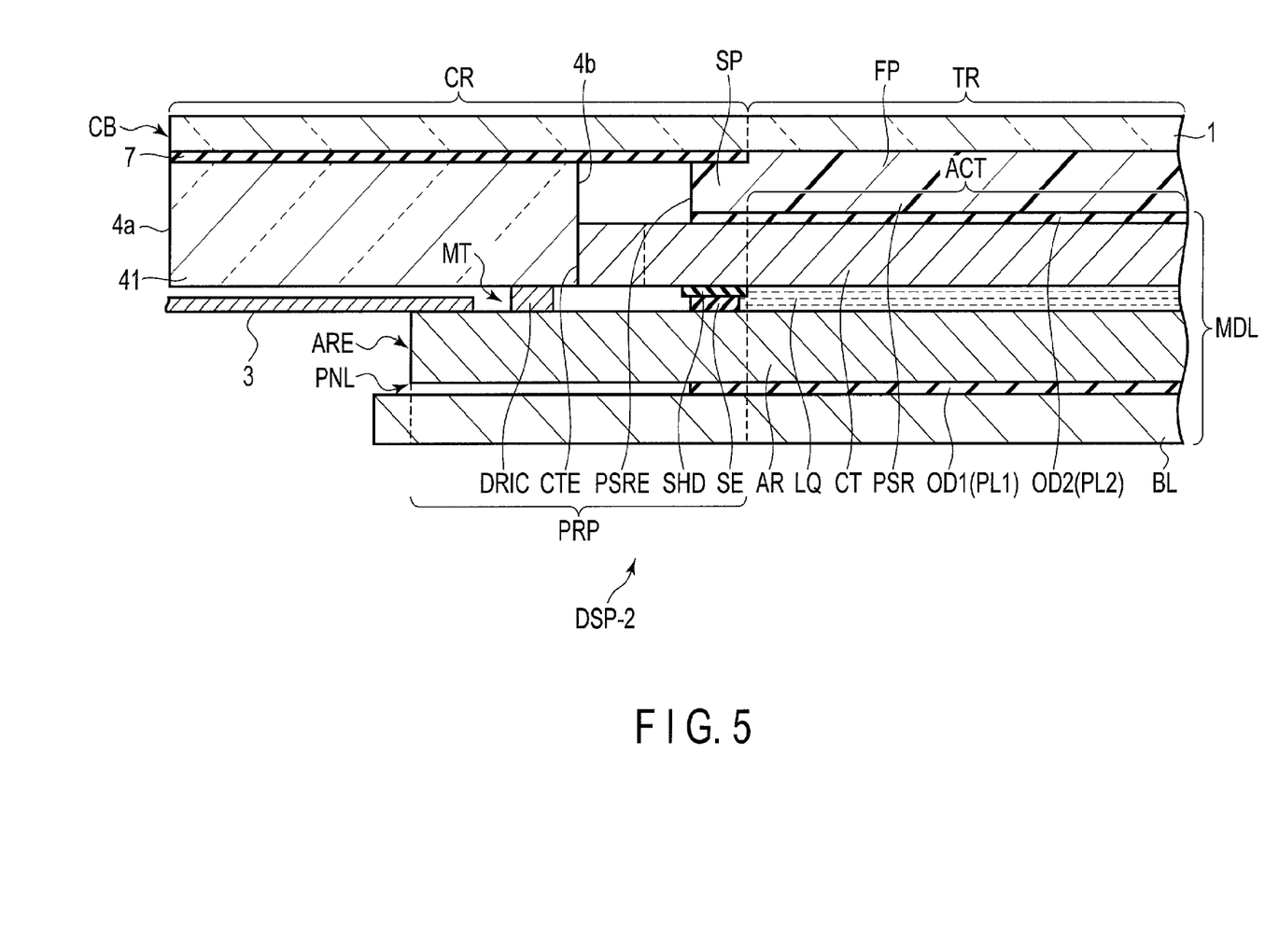
FIG. 5 is an enlarged cross-sectional view schematically illustrating a display device according to a second embodiment.

In the display device DSP-1 of the first embodiment, the thickness of the lightguide member 4 is calculated by equation (1). However, the thickness of the lightguide member is not limited to this example, and may be changed in various ways. For example, FIG. 5 schematically illustrates an enlarged cross-sectional view of a display device DSP-2 which does not employ a touchpanel type according to a second embodiment. In the display device DSP-2 of the second embodiment, the thickness of a lightguide member 41 is set by the following equation (2):

thickness of lightguide member=(thickness of polarizer PL2+thickness of cured photosensitive resin layer PSR+thickness of CF)−(thickness of liquid-crystal-panel driving IC chip DRIC+thickness of colored layer 7)  (2)

In this case, the lightguide member 41 is in contact with the liquid-crystal-panel driving IC chip DRIC. As a matter of course, the display device DSP-2 of the second embodiment has the same structures as the display device DSP of the first embodiment except for the following structures. The display device DSP-2 of the second embodiment comprises the lightguide member 41 in place of the lightguide member 4, and does not comprise a touchpanel or members necessary to drive the touchpanel.

In addition to the advantages of the first embodiment, the display device DSP-2 of the second embodiment is favorable in the following respect. Since the lightguide member 41 supports substantially the entire part of the end portion of a cover member CB on the light-shielding portion CR side from underneath, it is possible to prevent the cover member CB from bending or rolling back because of its own weight.

Figure 6:
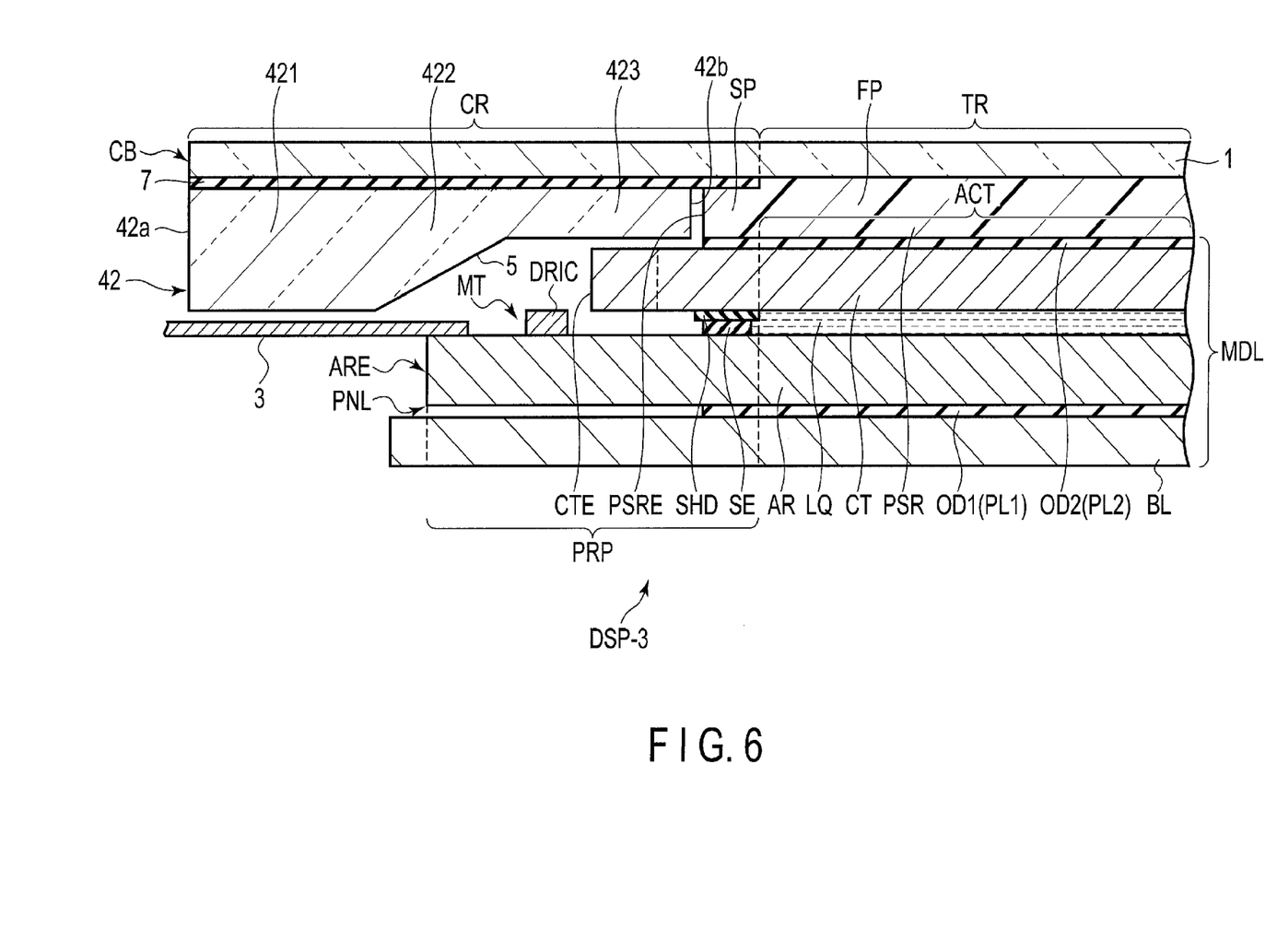
FIG. 6 is an enlarged cross-sectional view schematically illustrating a display device according to a third embodiment.

FIG. 6 schematically illustrates an enlarged cross-sectional view of a display device DSP-3 according to a third embodiment. The display device DSP-3 illustrated in FIG. 6 has the same structures as the display device DSP-2 of the second embodiment except for the form of a lightguide member 42. As illustrated in FIG. 6, in the lightguide member 42, a light-entrance-end area 421 including a light entrance face 42a is thicker than a light-exit-end area 423 including a light exit face 42b. A light concentration area 422 is formed between the light-entrance-end area 421 and the light-exit-end area 423. The upper surface of the lightguide member 42 including the upper surfaces of the light-entrance-end area 421, the light concentration area 422 and the light-exit-end area 423 is in contact with the lower surface of a cover member CB. The upper and lower surfaces of the light-entrance-end area 421 are parallel to each other. The upper and lower surfaces of the light-exit-end area 423 are also parallel to each other. The lower surface of the light concentration area 422, which is a transition area between the light-entrance-end area 421 and the light-exit-end area 423, has a positive inclination with respect to the upper surface. In this way, a photoreflective face 5 is formed.

The photoreflective face 5 is designed such that the light which has gone straight through the lightguide member 42, has reached the photoreflective face 5 and has been reflected by the photoreflective face 5 undergoes total internal reflection in the lightguide member 42. Specifically, the light reflected by the photoreflective face 5 goes to the upper face of the photoreflective face 5 and is reflected at an angle greater than a critical angle arcsin ($n_a/n_t$) with respect to the upper face. Thus, to cause the light reflected by the photoreflective face 5 to be reflected at an angle greater than the critical angle by the surface (the upper face) by which the light is reflected after the photoreflective face 5, the angle θ relative to the upper face of the photoreflective face 5 is set to an angle less than the angle defined by equation (3). The light which has undergone total internal reflection further goes through the lightguide member 42 and exits through the light exit face 42b. The light exits toward the photosensitive resin located under a light-shielding portion CR of the cover member CB. Thus, the photosensitive resin in this portion is cured. The light passing through the lightguide member 42 is collected in the light concentration area only by the ratio of the cross-sectional area of the light-entrance-end area to the cross-sectional area of the light-exit-end area. Thus, the curing of the photosensitive resin can be further enhanced.

$$\text{angle } \theta \text{ of photoreflective face } 5 = (\tfrac{1}{2}) \times ((\pi/2) - \arcsin(n_a/n_t)) \quad (3)$$

In the example illustrated in FIG. 6, the thickness of the light-exit-end area 423 is preferably equal to that of a cured photosensitive resin layer PSR. In the area overlapping a colored layer 7, the thickness of the light-exit-end area 423 is set between substantially the thickness of the cured photosensitive resin layer PSR and the sum of the thickness of the cured photosensitive resin layer PSR and the thickness of a polarizer PL2.

Figure 7:
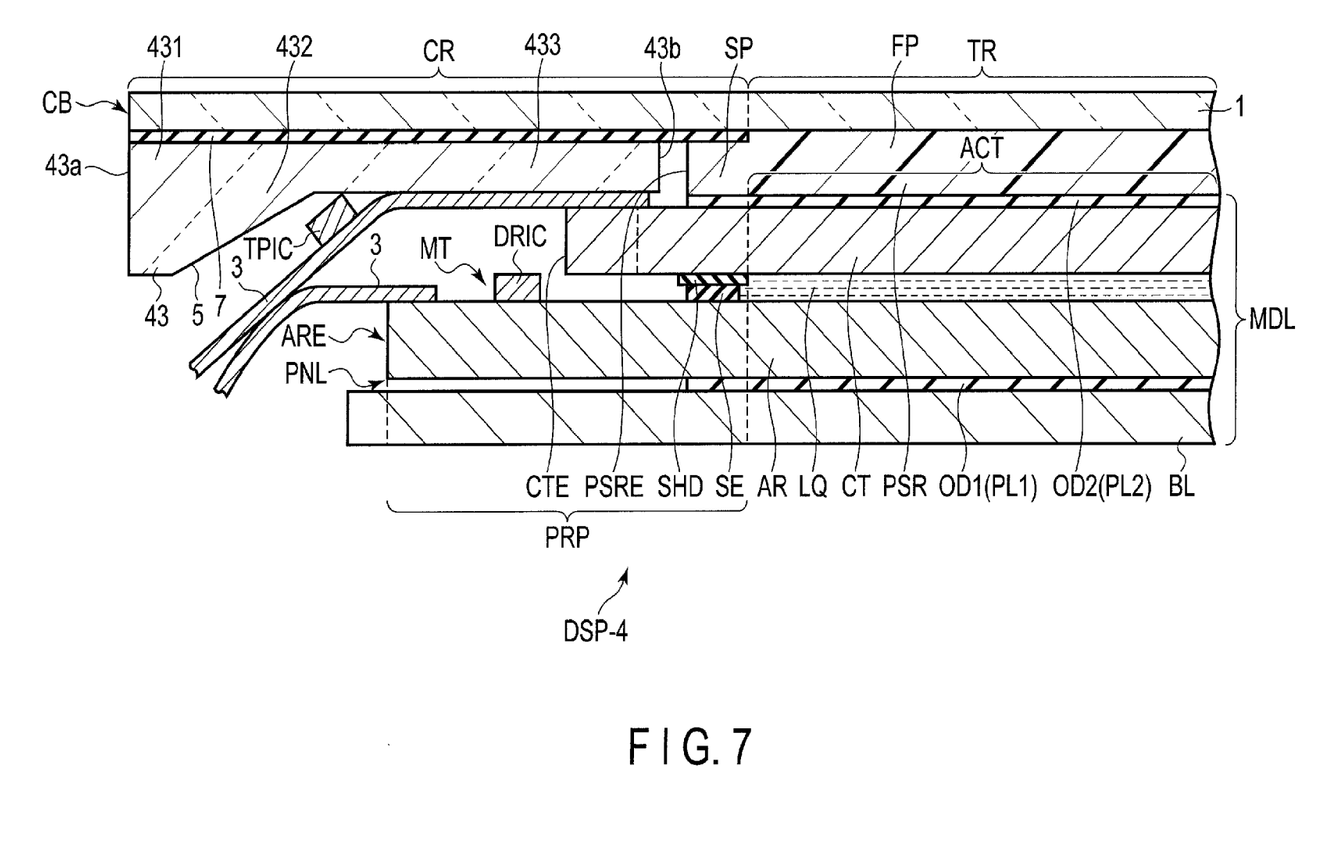
FIG. 7 is an enlarged cross-sectional view schematically illustrating a display device according to a fourth embodiment.

FIG. 7 schematically illustrates an enlarged cross-sectional view of a display device DSP-4 according to a fourth embodiment. The display device DSP-4 illustrated in FIG. 7 has the same structures as the display device DSP-1 of the first embodiment except for the shape of a lightguide member 43. As illustrated in FIG. 7, the shape of the lightguide member 43 provided in the display device DSP-4 is similar to that of the lightguide member 42 provided in the display device DSP-3 of the third embodiment. However, the sum of the thickness of a light-exit-end area 433 comprising a light exit face 43b, the thickness of an FPC substrate 3 on which a touchpanel driving IC chip TPIC is mounted, and the thickness of a colored layer 7 is equal to the sum of the thickness of the cured photosensitive resin layer PSR and the thickness of a polarizer PL2. The light-exit-end area 433 from a light concentration area 432 to the light exit face 43b is wider than the light-exit-end area 423 of the lightguide member 42 illustrated in FIG. 6. By contrast, a light-entrance-end area 431 comprising a light entrance face 43a is narrow. The dimensions of the light concentration area 432 are equal to those of the light concentration area 422 of the lightguide member 42.

As a matter of course, in the display devices of the second to fourth embodiments, the cured photosensitive resin layer PSR is prepared by the combination of light in perpendicular downward irradiation and light in lateral irradiation, in a manner similar to that of the display device of the first embodiment.

Figure 8:
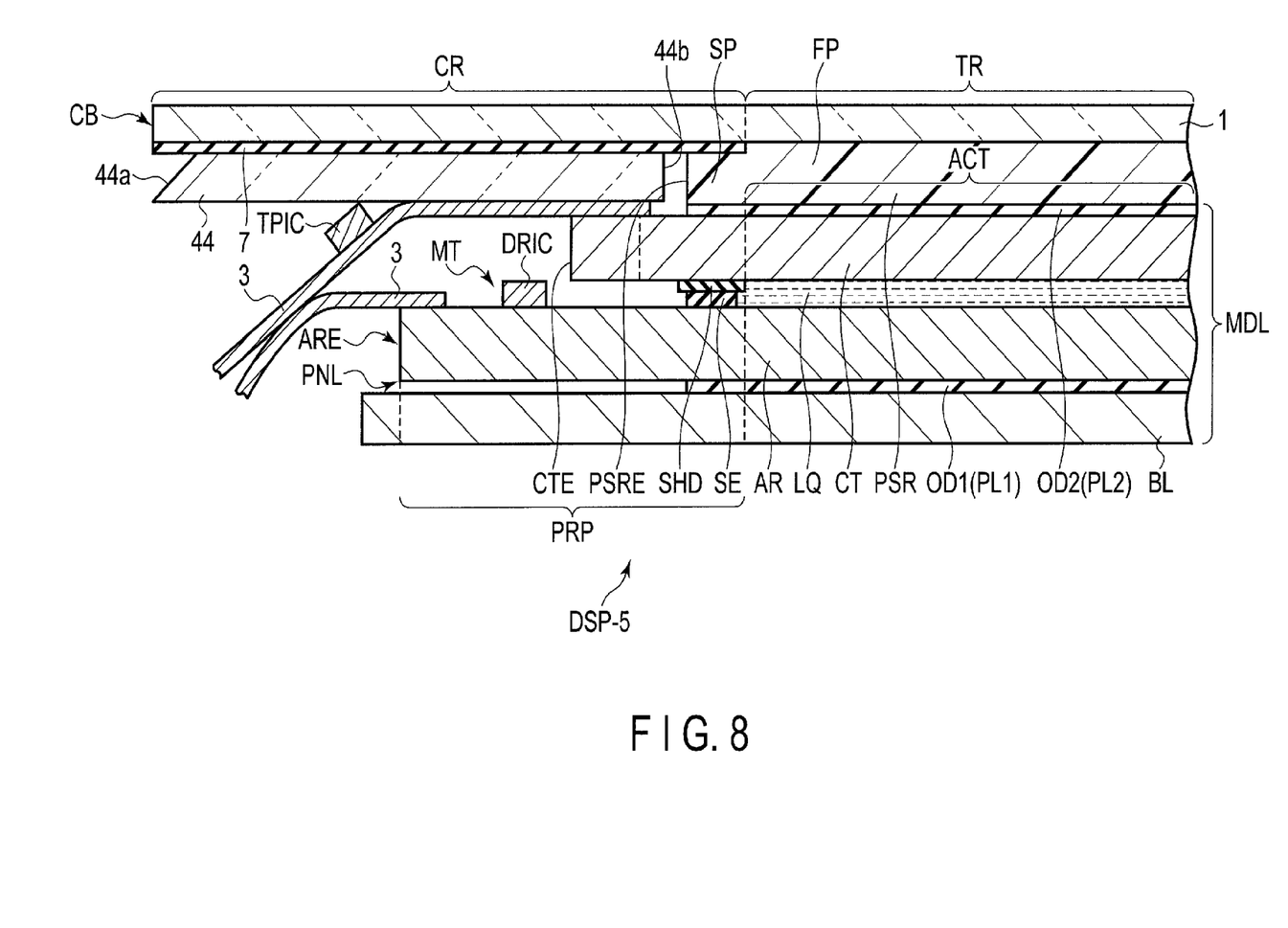
FIG. 8 is an enlarged cross-sectional view schematically illustrating a display device according to a fifth embodiment.

FIG. 8 schematically illustrates an enlarged cross-sectional view of a display device DSP-5 according to a fifth embodiment. The display device DSP-5 has the same structures as the display device DSP-1 of the first embodiment except that the shape of a lightguide member 44 slightly differs. In the display device DSP-5 of the present embodiment, when photosensitive resin is cured, perpendicular upward irradiation is used (in other words, the bottom surface of a cover member is perpendicularly irradiated with light) in place of the above lateral irradiation.

As illustrated in FIG. 8, the lightguide member 44 of the display device DSP-5 comprises a face 44a facing a light exit face 44b. The face 44a has a positive inclination with respect to the surface including the light exit face 44b (or with respect to the light emitted by perpendicular upward irradiation). The inclined face 44a reflects the light which entered the lower surface of the lightguide member 44 by perpendicular downward irradiation. The inclined face 44a causes the light to pass through the lightguide member 44 and go to the light exit face 44b. Thus, the inclined face 44a can be regarded as a reflective face. The angle of inclination may be, for example, 45 degrees.

When light is emitted perpendicularly to the flat surface of the cover member CB from the bottom, the light enters the lower surface of the lightguide member 44. The incident light is reflected by the reflective face 44a and changes its travelling direction in a direction parallel to the flat surface of the cover member CB (in other words, in a direction toward a photosensitive resin layer PSR). The light exits from the light exit face 44b to the photosensitive resin layer. In this manner, the photosensitive resin located under a light-shielding portion CR of the cover member CB is cured.

Figure 9:
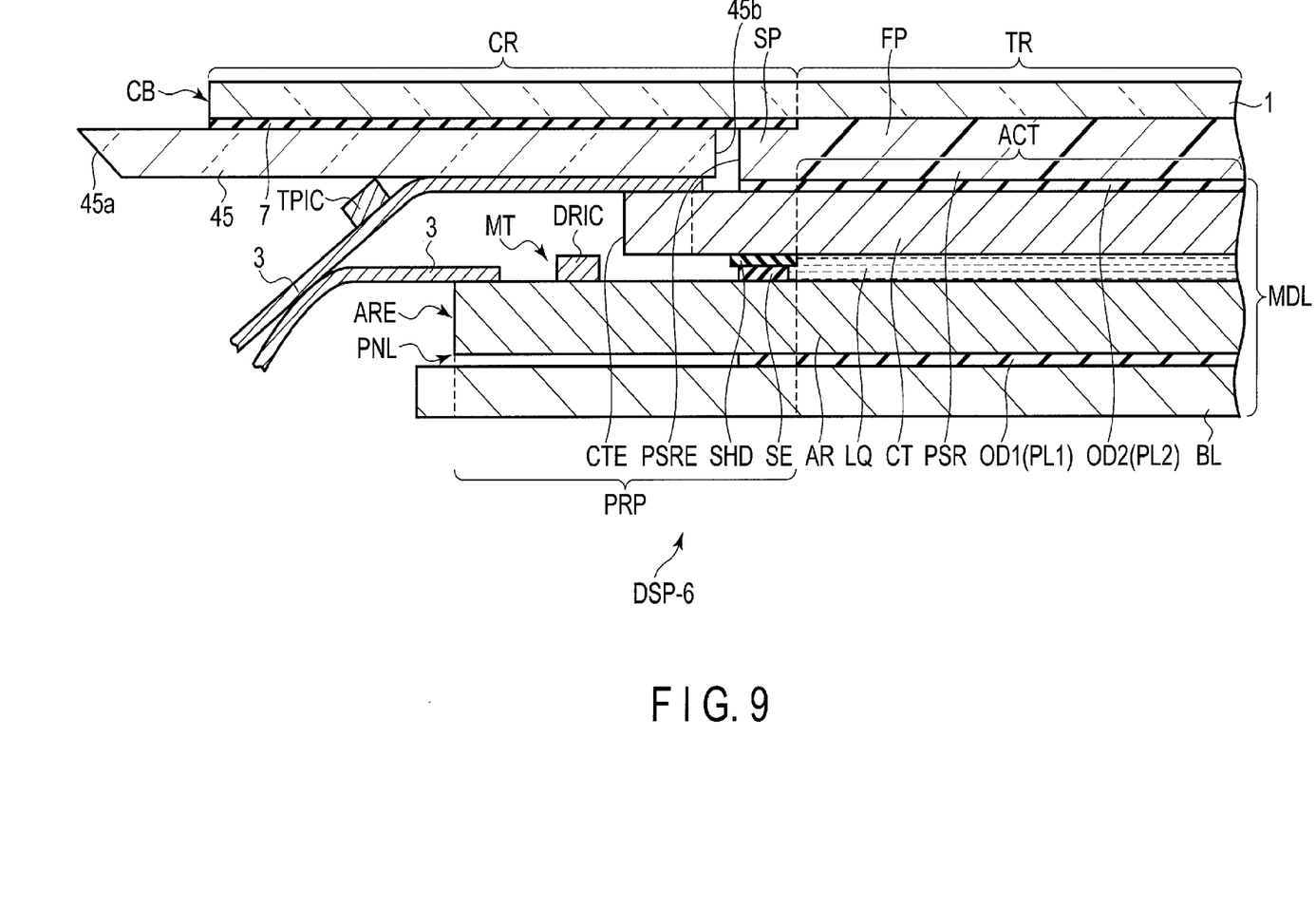
FIG. 9 is an enlarged cross-sectional view schematically illustrating a display device according to a sixth embodiment.

FIG. 9 schematically illustrated an enlarged cross-sectional view of a display device DSP-6 according to a sixth embodiment. The display device DSP-6 has the same structures as the display device DSP-1 of the first embodiment except that the shape of a lightguide member 45 slightly differs. In the display device DSP-6 of the present embodiment, when photosensitive resin is cured, perpendicular downward irradiation is used in place of the above lateral irradiation. Thus, photosensitive resin can be cured as a whole to form a cured layer PSR by perpendicular downward irradiation, including the portion located under a light-shielding portion CR of a cover member CB.

As illustrated in FIG. 9, the lightguide member 45 extends to the outside of the cover member CB. The lightguide member 45 comprises a face 45a facing a light exit face 45b. The face 45a has a negative inclination with respect to the surface including the light exit face 45b (or with respect to the light emitted by perpendicular downward irradiation). The inclined face 45a reflects the light which entered the upper surface of the lightguide member 45 by perpendicular downward irradiation. The inclined face 45a causes the light to pass through the lightguide member 45 and go to the light exit face 45b. Thus, the inclined face 45a can be regarded as a reflective face. The angle of inclination may be, for example, 45 degrees. At least the projection area of the reflective face 45a to the upper surface of the lightguide member 45 extends from the cover member CB.

When the top side of the cover member CB is perpendicularly irradiated with light, the light enters the upper surface of the lightguide member 45. The incident light is reflected by the reflective face 45a and changes its travelling direction in a direction parallel to the flat surface of the cover member CB (in other words, in a direction toward a photosensitive resin layer). The light exits from the light exit face 45b to the photosensitive resin layer. In this manner, the photosensitive resin located under the light-shielding portion CR of the cover member CB is cured. As a matter of course, perpendicular downward irradiation is applied to the whole surface of the cover member CB. Thus, the photosensitive resin located under a phototransmissive portion TR of the cover member can be cured in addition to the photosensitive resin located under the light-shielding portion CR of the cover member CB.

Figure 10:
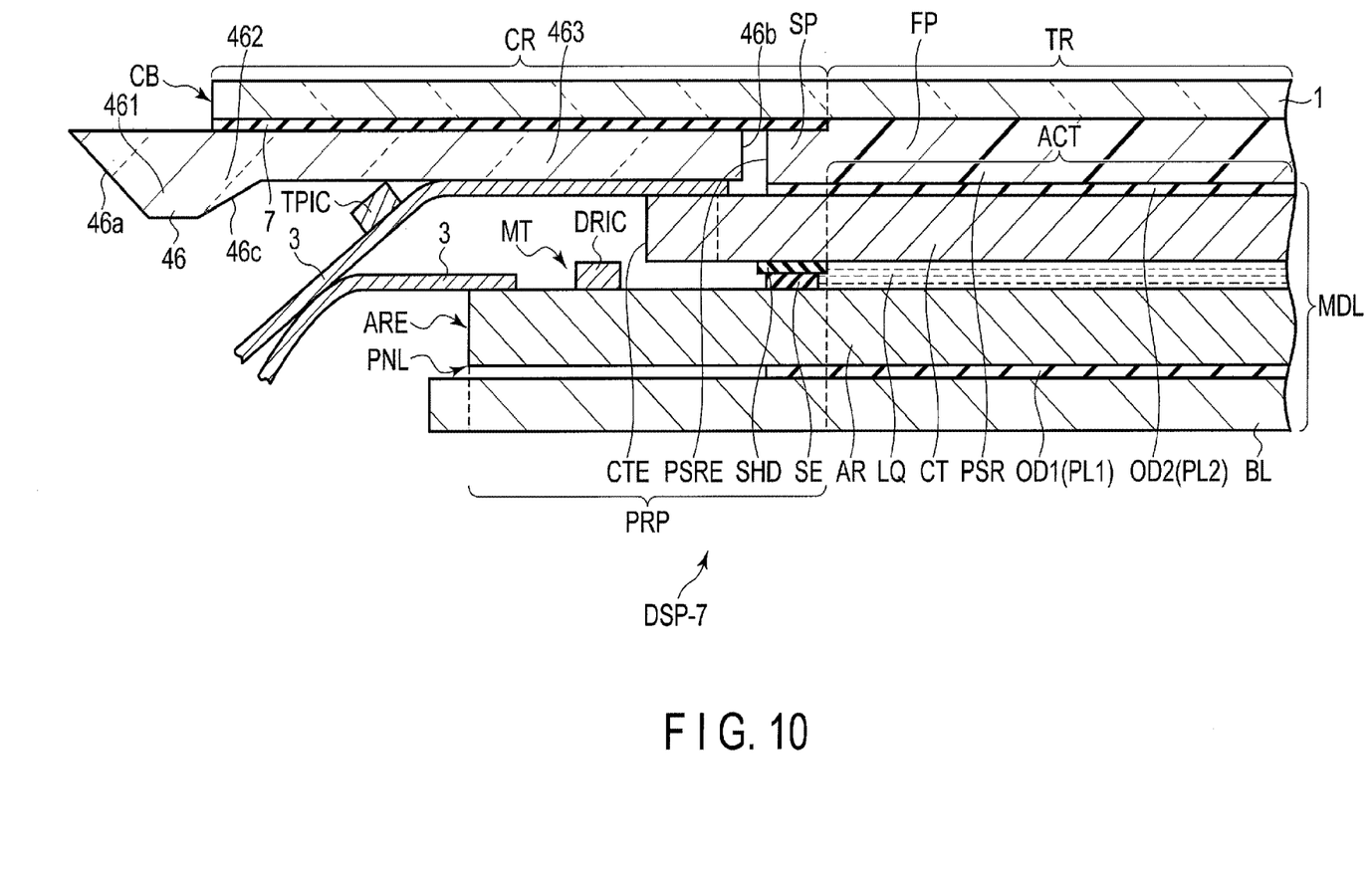
FIG. 10 is an enlarged cross-sectional view schematically illustrating a display device according to a seventh embodiment.

FIG. 10 schematically illustrates an enlarged cross-sectional view of a display device DSP-7 according to a seventh embodiment. The display device DSP-7 has the same structures as the display device DSP-6 of the sixth embodiment except for the shape of a lightguide member 46. The lightguide member 46 has both the function for reflecting the light emitted by perpendicular downward irradiation in the lightguide member 45 of the display device DSP-6 of the sixth embodiment and the function for collecting light which passes through inside in the display device DSP-4 of the fourth embodiment.

As illustrated in FIG. 10, in the lightguide member 46, a light-entrance-end area 461 including a light entrance face 46a is thicker than a light-exit-end area 463 including a light exit face 46b. A light concentration area 462 is formed between the light-entrance-end area 461 and the light-exit-end area 463. The light concentration area 462, which is a transition area between the light-entrance-end area 461 and the light-exit-end area 463, comprises a lower face 46c. The lower face 46c has a positive inclination with respect to the upper face, and constitutes a photoreflective face corresponding to the photoreflective face 5 of the lightguide member 45 of the display device DSP-3 illustrated in FIG. 6. The face 46a of the lightguide member 46 facing the light exit face 46b has a negative inclination with respect to the surface including the light exit face 46b (or with respect to the light emitted by perpendicular downward irradiation) similar to the inclined face 45a of the lightguide member 45 of the display device DSP-6 illustrated in FIG. 9.

When light is emitted perpendicularly to the flat surface of a cover member CB from the above, the light enters the upper surface of the lightguide member 46. The incident light is reflected by the reflective face 46a and changes its travelling direction in a direction parallel to the flat surface of the cover member CB (in other words, in a direction toward a photosensitive resin layer). The light passes through the lightguide member 46. Out of the light passing through the lightguide plate 46, the light reaching the reflective face 46c undergoes total internal reflection. The light which has undergone total internal reflection passes through the lightguide member 46 and exits from the exit face 46b. Thus, the photosensitive resin located under the cover member CB is cured. As a matter of course, perpendicular downward irradiation is applied to the whole surface of the cover member CB. Thus, the photosensitive resin located under a phototransmissive portion TR of the cover member can be cured in addition to the photosensitive resin located under a light-shielding portion CR of the cover member CB.

Figure 11:
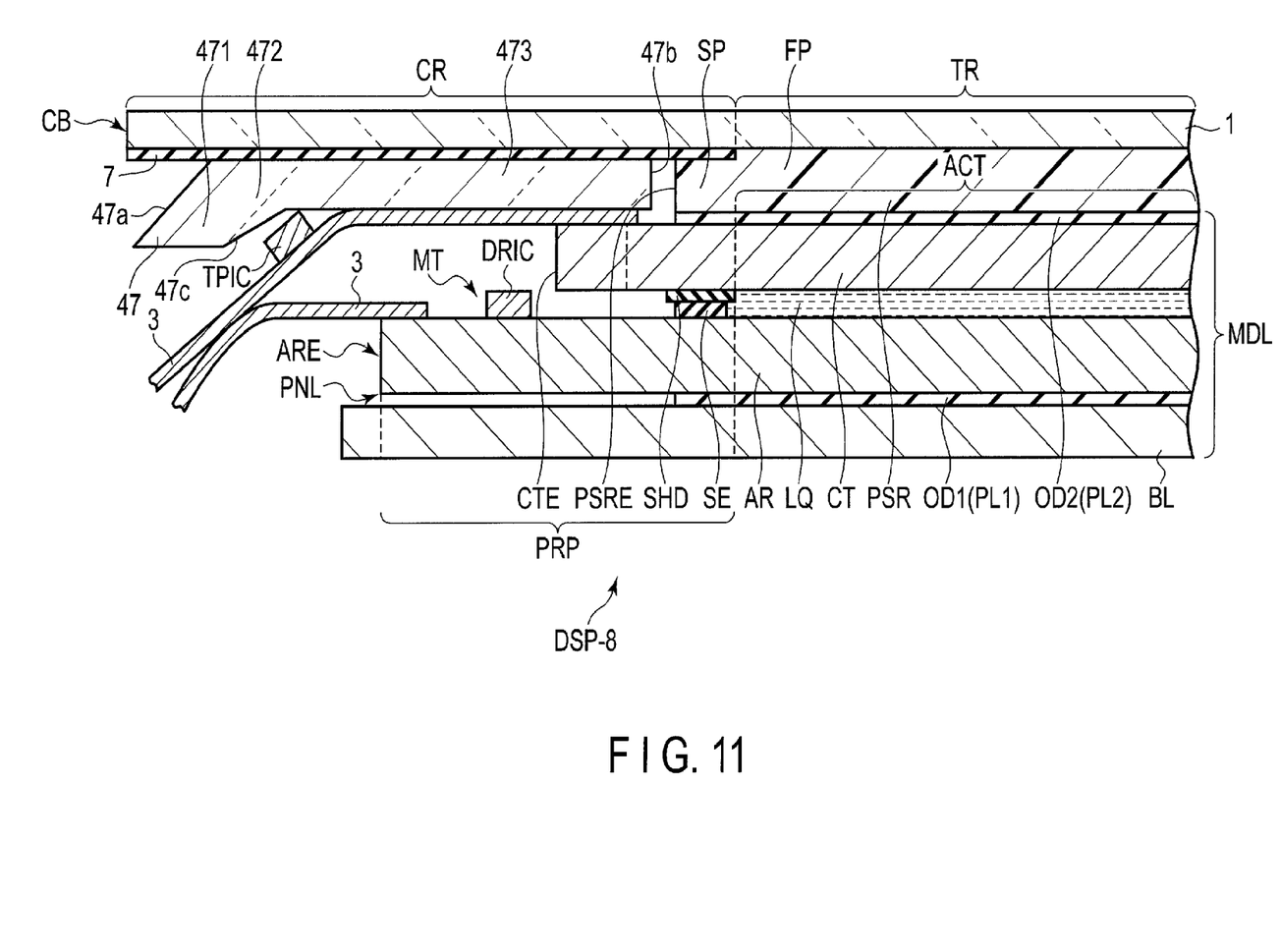
FIG. 11 is an enlarged cross-sectional view schematically illustrating a display device according to an eighth embodiment.

FIG. 11 schematically illustrates an enlarged cross-sectional view of a display device DSP-8 according to an eighth embodiment. The display device DSP-8 has the same structures as the display device DSP-5 of the fifth embodiment except that the shape of a lightguide member 47 slightly differs. The lightguide member 47 has both the function for reflecting the light emitted by perpendicular upward irradiation in the lightguide member 44 of the display device DSP-5 of the fifth embodiment and the function for collecting light which passes through inside in the display device DSP-4 of the fourth embodiment.

As illustrated in FIG. 11, in the lightguide member 47, a light-entrance-end area 471 including a light entrance face 47a is thicker than a light-exit-end area 473 including a light exit face 47b. A light concentration area 472 is formed between the light-entrance-end area 471 and the light-exit-end area 473. The light concentration area 472, which is a transition area between the light-entrance-end area 471 and the light-exit-end area 473, comprises a lower face 47c. The lower face 47c has a positive inclination with respect to the upper face, and constitutes a photoreflective face corresponding to the photoreflective face 5 of the lightguide member 44 of the display device DSP-3 illustrated in FIG. 5. The face 47a of the lightguide member 47 facing the light exit face 47b has a positive inclination with respect to the surface including the light exit face 47b (or with respect to the light emitted by perpendicular upward irradiation) similar to the inclined face 44a of the lightguide member 44 of the display device DSP-5 illustrated in FIG. 8.

When light is emitted perpendicularly to the flat surface of the cover member CB from the bottom, the light enters the lower surface of the lightguide member 47. The incident light is reflected by the reflective face 47a and changes its travelling direction in a direction parallel to the flat surface of the cover member CB (in other words, in a direction toward a photosensitive resin layer). The light passes through the lightguide member 47. Out of the light passing through the lightguide plate 47, the light reaching the reflective face 47c undergoes total internal reflection. The light which has undergone total internal reflection passes through the lightguide member 47 and exits from the exit face 47b. Thus, the photosensitive resin located under the cover member CB is cured. As a matter of course, perpendicular upward irradiation is applied to the whole surface of a cover member CB. Thus, the photosensitive resin located under a phototransmissive portion TR of the cover member can be cured in addition to the photosensitive resin located under a light-shielding portion CR of the cover member CB.

When the lightguide member 4 is structured as illustrated in FIG. 10 or FIG. 11, the incident light undergoes total internal reflection in the light concentration area by the first reflective face 5. Thus, light can be collected only by the ratio of the cross-sectional area of the light entrance side to the cross-sectional area of the light exit side. In this manner, the reaction efficiency of the photosensitive resin PSR can be enhanced. In addition, even if light is not emitted from the lateral side and is merely emitted perpendicularly to the flat surface of the cover member CB of the display device DSP, it is possible to cure the photosensitive resin layer PSR located behind the light-shielding portion (in other words, located in the shaded portion) with respect to the light for curing the photosensitive resin layer PSR.

EXAMPLES

The reaction rate of photosensitive resin cured to form the cured layer PSR (in other words, the degree of curing) was measured when ultraviolet light was emitted to the lateral side of the display device DSP-1 having the same structures as the first embodiment illustrated in FIG. 1.

As the photosensitive resin, acrylic resin cured by ultraviolet light was used.

As the lightguide member 4, polyethylene terephthalate resin was used.

For comparison, the reaction rate of photosensitive resin (in other words, the degree of curing) was measured for a display device having the same structures as the display device DSP-1 except that the lightguide member 4 was not provided.

The above display devices were irradiated with ultraviolet light from the lateral side. The reaction rate of photosensitive resin was measured twice for each display device. The results of measurement are shown in Table 1. The reaction rate of photosensitive resin was measured by a Raman spectrometric method.

TABLE 1

|  | Example (with lightguide member) | Comparison example (without lightguide member) |
| --- | --- | --- |
| First time | 95% | 61% |
| Second time | 94% | 71% |
| Average | 94.5% | 66% |

As shown in Table 1, the mean value of the reaction rate of resin for the photosensitive resin layer PSR in the display device which did not comprise the lightguide member 4 was 66%. On the other hand, the mean value of the reaction rate of resin in the display device DSP-1 comprising the lightguide member 4 was 94.5%. Thus, the reaction rate of the photosensitive resin layer PSR was increased by 28.5 points on an average by providing the lightguide member 4. The results show that, when the lightguide member 4 was provided in the peripheral area outside the photosensitive layer PSR, the light emitted from the lateral side was effectively guided to the photosensitive resin layer PSR. In this manner, the uncured photosensitive resin layer PSR located behind the light-shielding portion (in other words, located in the shaded portion) could be reduced with respect to the light for curing the photosensitive resin.

As explained above, according to the above embodiments, it is possible to provide a display device in which a display module is bonded with a cover member by a photosensitive resin layer, and the photosensitive resin layer even located behind a light-shielding portion (in other words, located in a shaded portion) can be cured with respect to the light for curing photosensitive resin.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display module comprising a display area which displays an image, and a peripheral area located outside the display area;
a cover member comprising a flat surface including a phototransmissive portion facing the display area, and a light-shielding area facing the peripheral area; and
a photosensitive resin layer which is provided between the display module and the cover member, and bonds the display module to the cover member, and
a curing lightguide member provided between the light-shielding area and the display module, and including a light entrance face and a light exit face opposed to the light entrance face,
wherein
an outer edge portion of the light-shielding area protrudes from the peripheral area,
the photosensitive resin layer comprises a first portion and a second portion, the first portion being provided over an entire part between the display area and the phototransmissive portion, the second portion extending from the first portion to a portion located under the light-shielding area,
the curing lightguide member is configured to transmit light having a wavelength for curing the photosensitive resin layer therethrough to make the light incident upon the photosensitive resin layer,
the light exit face faces an edge of the second portion, and
the curing lightguide member contacts the outer edge portion of the light-shielding area.

2. The display device of claim 1, wherein
the curing lightguide member comprises:
a light-entrance-end area including the light entrance face which the light enters;
a light-exit-end area including the light exit face from which the light exits toward the photosensitive resin layer; and
a light concentration area which is located between the light-exit-end area and the light-entrance-end area, and includes a first reflective face by which the light passing through the curing lightguide member is totally internally reflected, wherein
the light-entrance-end area is thicker than the light-exit-end area.

3. The display device of claim 1, wherein
the curing lightguide member comprises a second reflective face provided obliquely with respect to light emitted substantially perpendicularly to the flat surface of the cover member, and the second reflective face reflects the light entering the curing lightguide member in a direction of the photosensitive resin layer and thus changes a travelling direction of the light.

4. The display device of claim 1, wherein
the curing lightguide member comprises:
a light-entrance-end area including the light entrance face which the light enters;
a light-exit-end area including a light exit face from which emits the light exits toward the photosensitive resin layer; and
a light concentration area which is provided between the light-exit-end area and the light-entrance-end area, and includes a first reflective face by which the light passing through the curing lightguide member is totally internally reflected, wherein
the light-entrance-end area includes a second reflective face provided obliquely with respect to light emitted substantially perpendicularly to the flat surface of the cover member, and the second reflective face reflects the light entering the curing lightguide member in a direction of the photosensitive resin layer and thus changes a travelling direction of the light, and the light-entrance-end area is thicker than the light-exit-end area.

5. The display device of claim 1, wherein
the photosensitive resin layer is of an ultraviolet-cured resin, and
the curing lightguide member transmits light having an ultraviolet wavelength therethrough.

6. The display device of claim 5, wherein
the ultraviolet wavelength is in a range of 365 to 405 nm, and
the curing lightguide member has a transmittance of 80% or greater with respect to ultraviolet light in the range of 365 to 405 nm.

7. The display device of claim 1, wherein
the curing lightguide member is formed of polyethylene terephthalate.

8. A display device comprising:
a display panel comprising a display area which displays an image, and a peripheral area located outside the display area;
a cover member comprising a phototransmissive portion overlapping the display area, and a light-shielding area overlapping the peripheral area; and
a photosensitive resin layer which bonds the display panel with the cover member, wherein
an outer edge portion of the light-shielding area protrudes from an edge face of the display panel,
the photosensitive resin layer comprises:
a first portion provided between the display area and the phototransmissive portion;
a second portion provided between the peripheral area and the light-shielding area, and
a lightguide sheet is provided between the cover member and the display panel, and transmits light having a wavelength for curing the photosensitive resin layer therethrough, and
the lightguide sheet contacts the outer edge portion of the light-shielding area.

9. The display device of claim 8, wherein
the lightguide sheet comprises:
a light entrance area which the light enters; and
a light exit area through which the light exits, wherein
the light entrance area is thicker than the light exit area.

10. The display device of claim 8, wherein
the phototransmissive portion of the cover member comprises a flat surface, and
the lightguide sheet comprises a reflective face provided obliquely with respect to the flat surface of the phototransmissive portion.

11. The display device of claim 9, wherein
the display area of the display panel comprises a flat surface, and
the lightguide sheet comprises a reflective face between the light entrance area and the light exit area, and the reflective face is provided obliquely with respect to the flat surface of the display area.

12. The display device of claim 8, wherein
the photosensitive resin layer is of an ultraviolet-cured resin, and
transmits light having an ultraviolet wavelength therethrough.

13. The display device of claim 12, wherein
the ultraviolet wavelength is in a range of 365 to 405 nm, and
the lightguide sheet has a transmittance of 80% or greater with respect to ultraviolet light in the range of 365 to 405 nm.

14. The display device of claim 8, wherein
the lightguide sheet is formed of polyethylene terephthalate.

* * * * *